US005305371A

United States Patent [19]

Saegusa et al.

[11] Patent Number: 5,305,371
[45] Date of Patent: Apr. 19, 1994

[54] CORDLESS KEY TELEPHONE SYSTEM FOR REPEATING ATTEMPTS TO ALERT STATIONS LOCATED IN INTERFERENCE-AFFECTED ZONES

[75] Inventors: Noboru Saegusa; Naoyasu Nishimura; Ichiro Tamura, all of Tokyo, Japan

[73] Assignees: NEC Corporation; Nippon Telegraph and Telephone Corporation, both of Tokyo, Japan

[21] Appl. No.: 947,853

[22] Filed: Sep. 21, 1992

[30] Foreign Application Priority Data

Sep. 20, 1991 [JP] Japan .................. 3-241667

[51] Int. Cl.$^5$ .................. H04M 11/00; H04Q 7/00
[52] U.S. Cl. .................. 379/58; 455/33.4
[58] Field of Search .......... 370/93; 375/100; 379/56, 58, 59, 63; 455/33.1, 33.4, 54.2, 56.1

[56] References Cited

U.S. PATENT DOCUMENTS

| | | | |
|---|---|---|---|
| 4,672,608 | 6/1987 | Ball et al. .................. | 370/93 |
| 4,829,554 | 5/1989 | Barnes et al. .................. | 379/58 |
| 5,131,010 | 7/1992 | Derrerge et al. .................. | 375/100 |
| 5,218,716 | 6/1993 | Comroe et al. .................. | 455/33.4 |

*Primary Examiner*—Jin F. Ng
*Assistant Examiner*—William D. Cumming
*Attorney, Agent, or Firm*—Sughrue, Mion, Zinn, Macpeak & Seas

[57] ABSTRACT

In a cordless key telephone system where adjacent service zones having the same control channel are overlapped, forming an unavoidable interference-affected overlapping zone, a main unit initially selects an access unit from each service zone in response to an incoming call from a network and transmits a first alert signal to that unit where it is broadcast to elicit an acknowledgement (ACK) signal from cordless stations. On receiving it, the access unit selects a speech channel, broadcasts a first channel assignment signal on the control channel, and then a first ringing signal on the selected speech channel. The main unit determines whether there is a cordless station failing to respond to the first alert signal. If such a station exists, the main unit selects a first, idle access unit which is located in one of the adjacent service zones. A second alert signal is then broadcast on a control channel from the first access unit. Following receipt of an ACK signal from a cordless station, a second channel assignment signal is broadcast from the first access unit, signalling the identification of a speech channel previously selected by a second, initially selected access unit located in the adjacent service zones. A second ringing signal is broadcast from the second access unit on the previously selected speech channel.

4 Claims, 8 Drawing Sheets

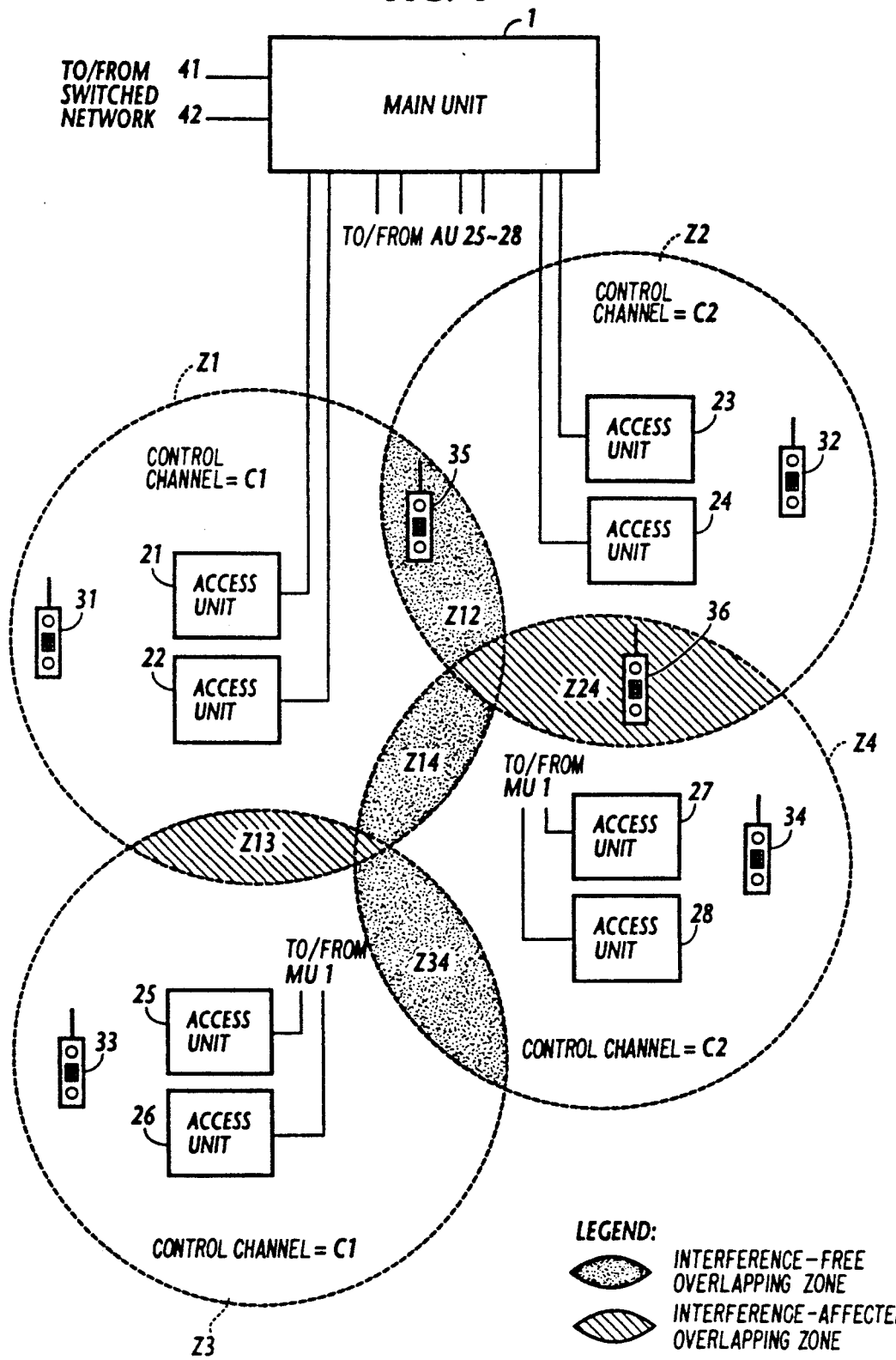

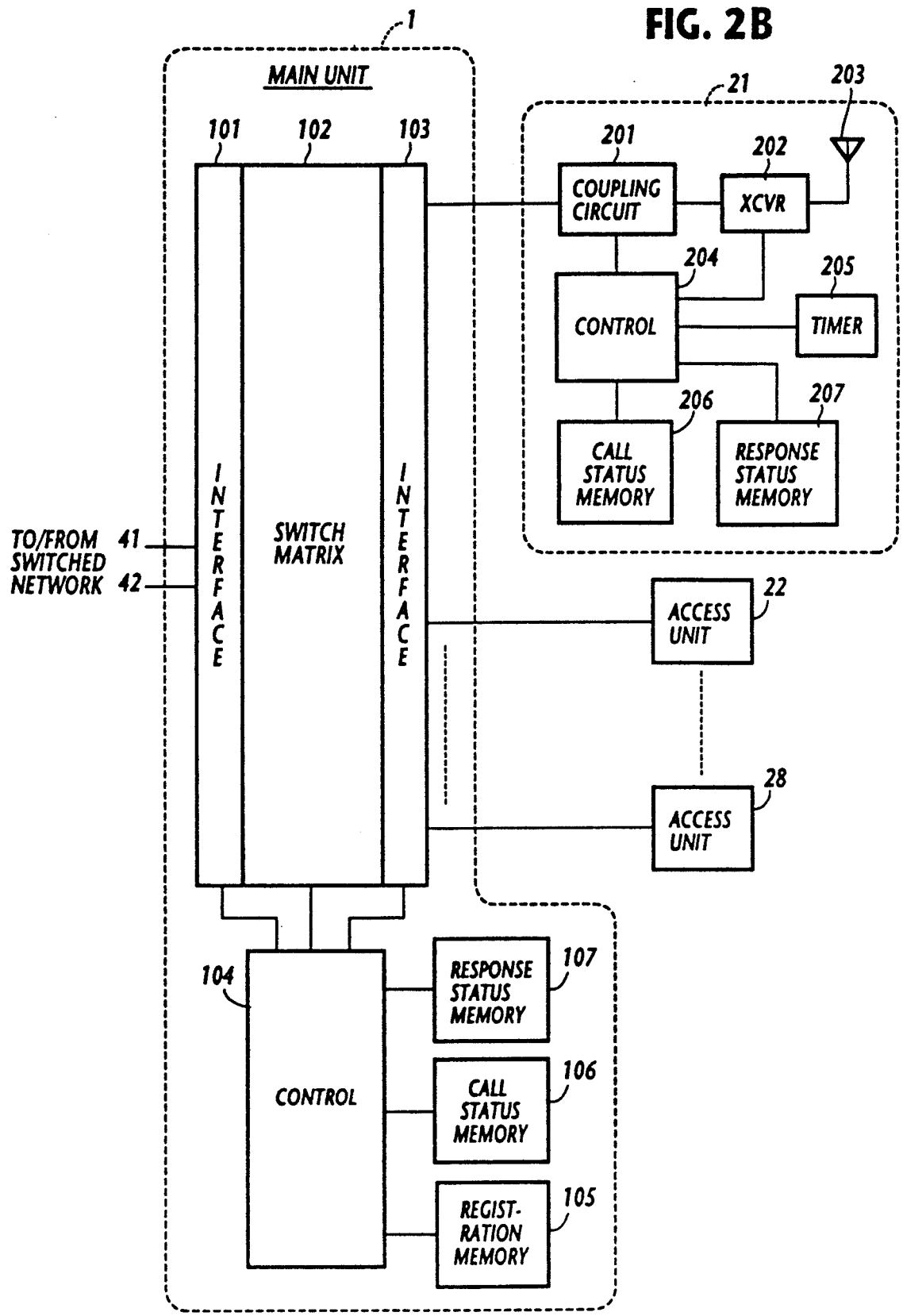

FIG. 3A

REGISTRATION MEMORY

| #1 | #2 | #3 | #4 | #5 | #6 | #7 | #8 |
|---|---|---|---|---|---|---|---|
| 1 | 1 | 1 | 1 | 1 | 1 | 0 | 0 |

⌐ 105

DATA A

CALL STATUS MEMORY

| #1 | #2 | #3 | #4 | #5 | #6 | #7 | #8 |
|---|---|---|---|---|---|---|---|
| 1/0 | 1/0 | 1/0 | 1/0 | 1/0 | 1/0 | 1 | 1 |

⌐ 106

DATA B

RESPONSE STATUS MEMORY

| #1 | #2 | #3 | #4 | #5 | #6 | #7 | #8 |
|---|---|---|---|---|---|---|---|
| 1/0 | 1/0 | 1/0 | 1/0 | 1/0 | 1/0 | 0 | 0 |

⌐ 107

DATA C

FIG. 3B

CALL STATUS MEMORY

| #1 | #2 | #3 | #4 | #5 | #6 | #7 | #8 |
|---|---|---|---|---|---|---|---|
| 1/0 | 1/0 | 1/0 | 1/0 | 1/0 | 1/0 | 1 | 1 |

⌐ 206

DATA B

RESPONSE STATUS MEMORY

| #1 | #2 | #3 | #4 | #5 | #6 | #7 | #8 |
|---|---|---|---|---|---|---|---|
| 1/0 | 1/0 | 1/0 | 1/0 | 1/0 | 1/0 | 0 | 0 |

⌐ 207

DATA c

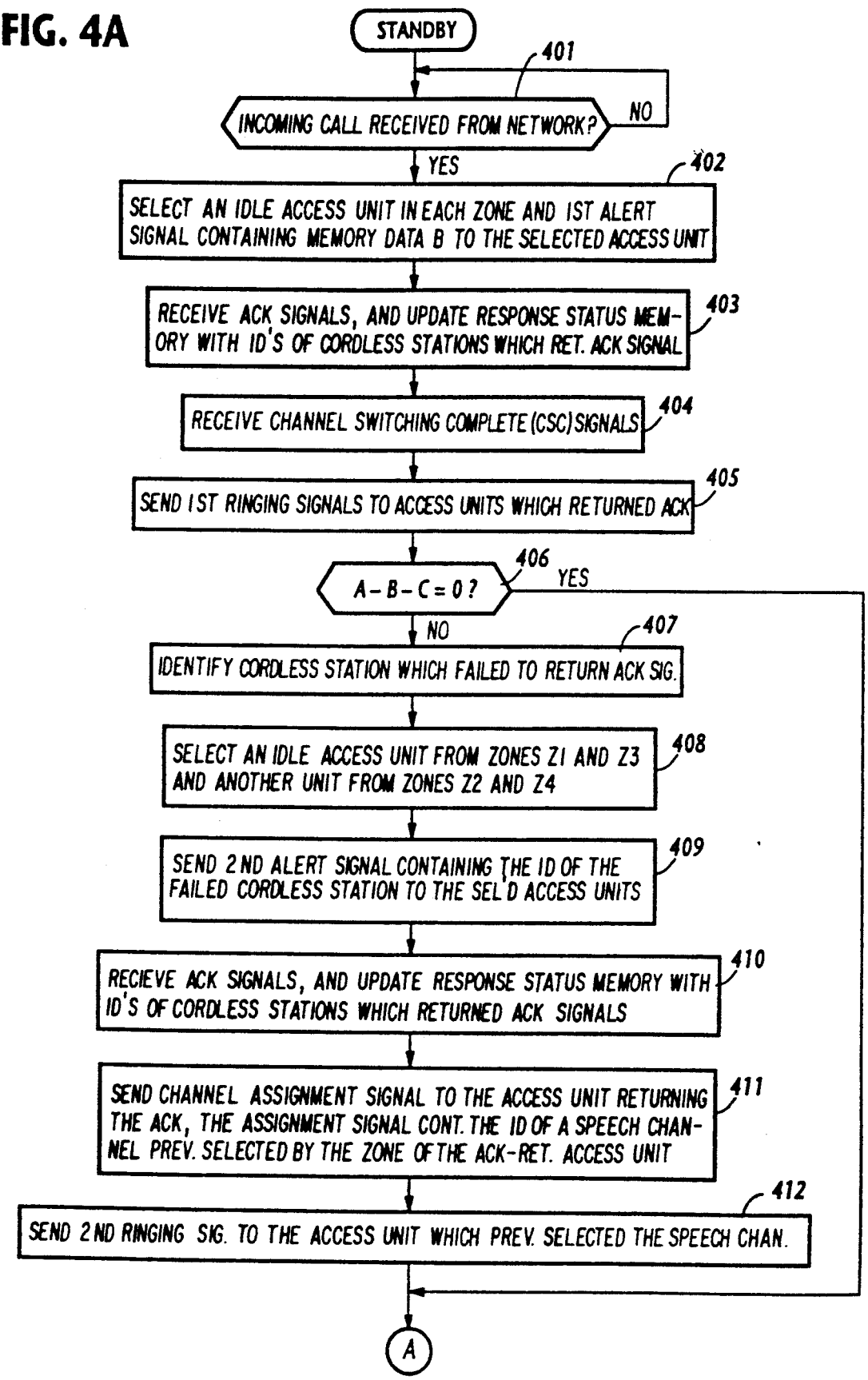

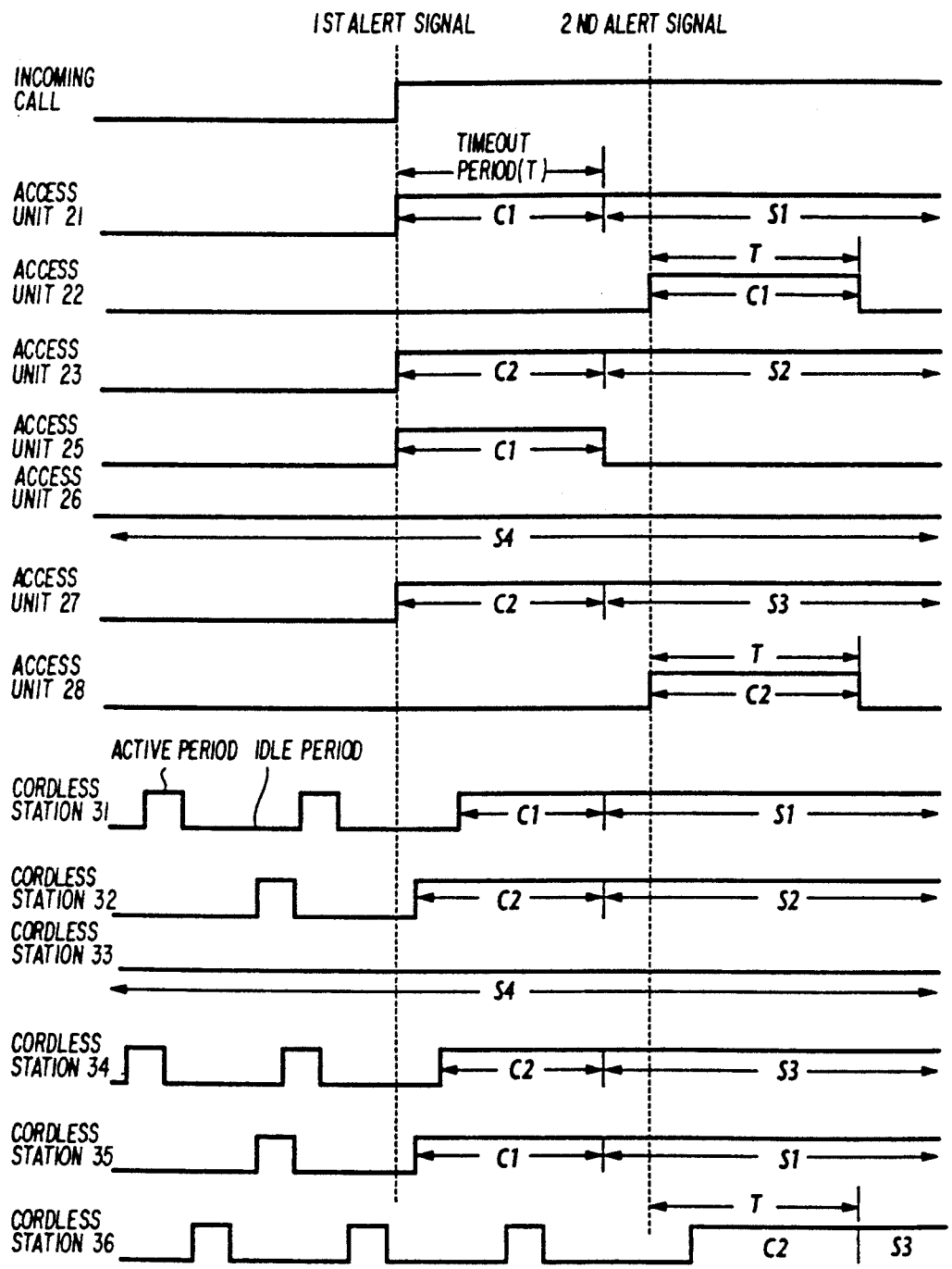

CORDLESS KEY TELEPHONE SYSTEM FOR REPEATING ATTEMPTS TO ALERT STATIONS LOCATED IN INTERFERENCE-AFFECTED ZONES

BACKGROUND OF THE INVENTION

The present invention relates generally to cordless telephone systems, and more specifically to a cordless key telephone system covering a plurality of service zones which may partially overlap, forming interference-affected zones due to the assignment of a single control channel to adjacent service zones.

Conventional cordless key telephone systems comprise a main unit having first terminals connected to a public or local switched network and second terminals connected to access units located at strategic points of service zones. Each access unit exchanges call-processing signals over control channels with cordless stations and the main unit during call setup times and establishing a speech channel to a cordless station when entering a talking mode. The main unit includes a switch matrix for establishing a switched connection between the network and an appropriate access unit to link the cordless station to the network. During an idle state, each cordless station monitors the control channels assigned to the system. On receiving an incoming call from the network, the main unit selects an access unit for each service zone and causes an alert signal to be broadcast on a control channel assigned to the zone of the selected access unit to elicit an acknowledgment response from cordless stations located in that zone. On receiving that response, the access unit proceeds to select a speech channel and causes the responding stations to switch to the speech channel, whereupon the access units, to which the acknowledgment signals have been returned, broadcast ringing signals on respective speech channels. Since the number of control channels allotted to the system is limited, the channel switching prior to the transmission of a ringing signal is to prevent the control channel from being tied up for a long time before the incoming call is answered. On the other hand, access units are usually located so that the marginal portions of adjacent service zones overlap each other to cover the entire area of a floor space. Care is usually taken to avoid usage of the same control channel by adjacent zones. However, due to the limited number of control channels, some of the overlapping zones may be free from interference, but in other areas interference cannot be avoided. If a cordless station happens to be located in the interference-affected zone, interference occurs between alert signals sent from the adjacent service zones and that cordless station fails to respond to it and receives no ringing signal.

SUMMARY OF THE INVENTION

It is therefore an object of the present invention to provide a cordless key telephone system that eliminates the likelihood of a situation where a cordless station fails to receive ringing signal.

According to the present invention, there is provided a cordless key telephone system for servicing a plurality of service zones to which control channels are respectively assigned. Adjacent service zones of the system partially overlap, forming one or more marginal overlapping zones in which interference occurs due to assignment of a single control channel to the adjacent service zones. The system comprises a main unit having first terminals connected to a public or local switched network and second terminals for establishing a connection therebetween. A plurality of access units are connected to the second terminals of the main unit for establishing a radio-frequency channel to cordless stations. In response to an incoming call from the network, the main unit selects an access unit from each of the service zones and transmits a first alert signal to it to broadcast therefrom. On receiving a response from a cordless station, the access unit selects a speech channel and broadcast, on the control channel assigned thereto, a first channel assignment signal signalling the channel identification to the alerted cordless station to cause it to switch to the selected speech channel. A first ringing signal is then broadcast from the access unit on the speech channel to alert the user at the cordless station. The main unit determines whether there is a cordless station which has failed to respond to the first alert signal. If this is the case, the main unit selects a first access unit which is not initially selected and located in one of the adjacent zones. A second alert signal is broadcast from the first access unit on the control channel assigned thereto to elicit a response from the cordless station possibly located in the interference-affected zone. In response to an acknowledgment signal from a cordless station signalling receipt of the second alert signal, a second channel assignment signal is broadcast from the first access unit on the control channel assigned thereto, signalling the identification of a speech channel previously selected by a second access unit which is located in one of the adjacent service zones and is initially selected, whereby the cordless station suspected of having failed to respond to the first alert signal can be switched to the previously selected speech channel, on which a second ringing signal is then broadcast from the second access unit.

BRIEF DESCRIPTION OF THE DRAWINGS

The present invention will be described in further detail with reference to the accompanying drawings, in which:

FIG. 1 is a block diagram of a cordless key telephone system of the present invention;

FIGS. 2a and 2b are block diagrams of the main unit and access units of FIG. 1;

FIGS. 3A and 3B show details of memories used in the main unit and each of the access units;

FIGS. 4A and 4B are flowcharts of programmed instructions performed by the control unit of the main unit;

FIG. 6 is a timing diagram useful for describing a typical operation of the system.

DETAILED DESCRIPTION

Figure 4B:
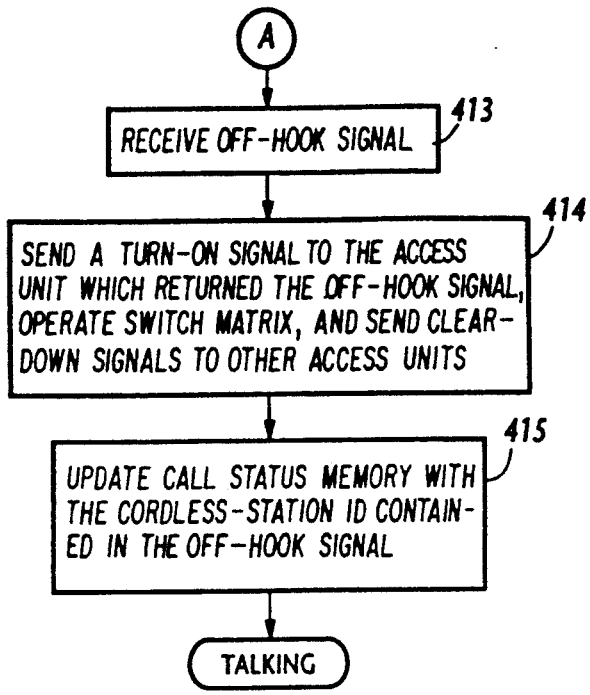

Referring now to FIG. 1, there is shown a cordless key telephone system according to the present invention. The system includes a main unit 1 and a plurality of access units 21 through 28 connected to the main unit. Exchange lines 41 and 42 from a public or local switched telephone network are terminated to the main unit where a switched connection is established between the exchange lines and the access units in response to an incoming call from the network or in response to a call request from the access units. The service area of the system is divided into four service zones Z1 through Z4 which are partially overlapped as illustrated and zones Z1 and Z3 are assigned control channel C1 and zones Z2 and Z4, and control channel C1 is assigned to zones Z1, Z3 and control channel C2 to zones Z2 and Z4. Therefore, the overlapping zones between service zones of different control channels, such as overlapping zones Z12, Z14, and Z34 are free from radio-frequency interference, while the overlapping zones between zones of the same control channel, such as zones Z13 and Z24, are affected by interference. Two access units are located in each zone, and as a typical example, six cordless stations 31 through 36 are provided in the system.

As shown in FIG. 2, the exchange lines are terminated through an interface 102 to one side of a switch matrix 102 of the main unit and the access units are terminated through an interface 103 to the other side of the switch matrix. A control unit 104 is connected to the interface units 101, 103 and switch 102 to establish a speech connection between therebetween after exchanging control signals with the access units using data stored in a registration memory 105, a call status memory 106 and a response status memory 107 in a manner as will be described in detail later. Each access unit comprises a coupling circuit 201 through which control signals from the main unit are supplied to the control unit 204 of the access unit and control signals from the access unit are supplied from control unit 204 through coupling circuit 201 to the main unit or a transceiver 202 where it is modulated onto a carrier and broadcast from antenna 203 to the cordless stations. Each access unit includes a timer 205 for setting a timeout period T, a call status memory 205 and a response status memory 206 which correspond respectively to the call and response status memories 106, 107 at the main unit.

All memories of the system are of eight-bit configuration as shown in FIGS. 3A and 3B. The eight-bit locations of each memory correspond respectively to cordless stations of a maximum number. Since it is assumed that the system has six cordless stations, bit zero's are set to the seventh and eighth positions of the registration memory 105 and response status memories 107, 207, and bit one's are set to the corresponding positions of the call status memories 106 and 206. The first to sixth bit positions of all memories are assigned respectively to cordless stations 31 to 36. Bits one's and zero's in the first to sixth positions of both call status memories 106, 206 respectively indicate busy and idle status of the corresponding cordless stations, and bits one's and zero's in the first to sixth positions of both response status memories 107, 207 respectively indicate the presence and absence of a response from the corresponding cordless stations. Data stored in registration memory 105 will be referred to as data A, those stored in call and response status memories 106 and 107 will be referred to as data B and C, respectively. The data stored in call status memory 206 will be referred to as data B since it is wholly updated with the contents of memory 106, and the data stored in response status memory 207 will be referred to as data c which forms part of data C.

Figure 5B:
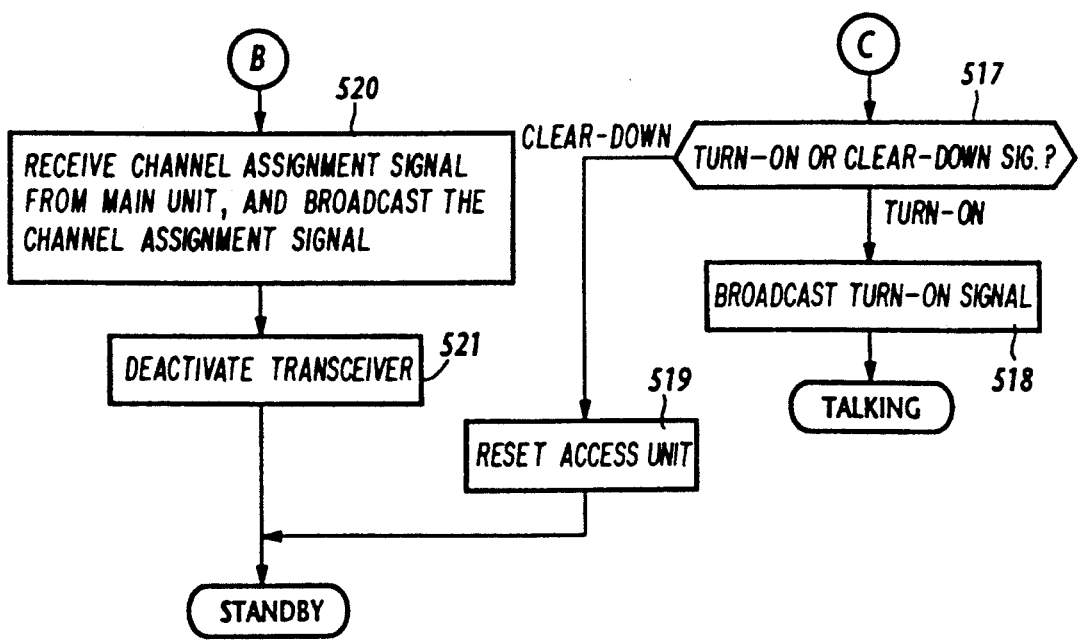
FIGS. 5A and 5B are flowcharts of programmed instructions performed by the control unit of each access unit.
Figure 5A:
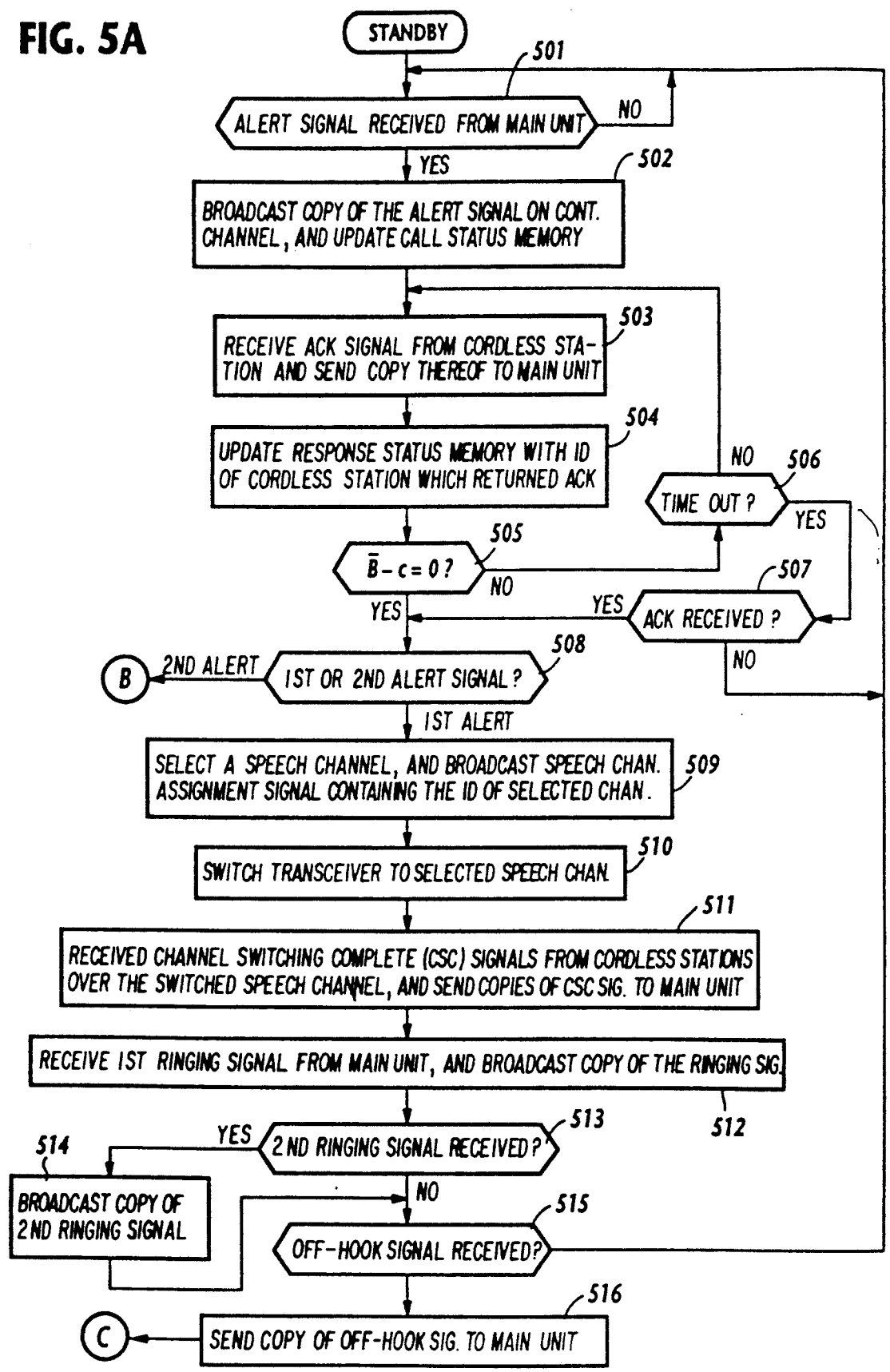

The control unit 104 at the main unit is a microprocessor-based controller which is programmed to execute instructions as shown in flowcharts of FIGS. 4A and 4B, and the control unit 204 at each of the access units is also a microprocessor-based controller programmed to execute instructions as shown in flowcharts of FIGS. 5A and 5B. Since the present invention is concerned only with the setting up of a connection when an incoming call is received from the network, all flowcharts illustrate those processes which are necessary for this purpose.

In FIGS. 4A and 4B, the program execution at the main unit begins with decision step 401 to determine whether an incoming call is received from the network. If the answer is affirmative, control branches to step 402 to select an idle access unit from each zone and send a first alert signal containing call status data B to the selected access units.

As will be described in detail later, copies of the first alert signals will broadcast from the selected access units on the respectively assigned control channels, and acknowledgement (ACK) signals containing cordless station identifiers will be returned from the cordless stations which successfully received the alert signal using the same control channels. Each of these access units returns a copy of the ACK response to the main unit and broadcasts a channel assignment signal indicating a speech channel to be used by the respective zone. On receiving the channel assignment signal, each cordless station that returned the ACK switches its transceiver from the control channel to the assigned speech channel and returns a channel switching complete (CSC) signal to the associated access unit, where it is copied and sent to the main unit.

At the main unit, control exits to step 403 to receive the ACK signals from the access units and update the response status memory 107 with the identifiers contained in the received ACK signals. Exit then is to step 404 to receive the CSC signal from the access units. First ringing signals are then transmitted from the main unit to the access units (step 405), where they are copied and broadcast, so that the ACK-returning cordless stations are alerted with a ringing tone and a visual call indication is given.

Control advances to decision step 406 to check to see if A-B-C=0. Namely, at the main unit, the data stored in the call and response status memories 106 and 107 are subtracted from the data stored in registration memory 105 to determine whether there is a cordless station which has failed to respond to the first alert signal. If all cordless stations answered the first alert signal, the decision at step 406 is affirmative, and control branches to step 413; otherwise, it branches to step 407 to detect the cordless station which has failed to respond to the first alert signal, using the result of step 406.

Since interference is likely to occur in overlapping zones Z13 and Z24 during transmission of the first alert signal, a search is made through zones Z1 and Z3 to select an idle access unit to broadcast a second alert signal to a cordless station which may possibly be located in zone Z13, and a similar attempt is made with respect to zone Z24 to broadcast a second alert signal to a cordless station possibly located in that zone. To this end, step 408 is executed to select an idle access unit from zones Z1 and Z3 and an another idle access unit from zones Z2 and Z4. Exit then is to step 409 to send to the selected units a second alert signal containing the identifier of the cordless station which is determined by step 407 as having failed to respond to the first alert signal.

As will be described, the access units selected by step 408 broadcast a copy of the received second alert signal and wait for the return of an ACK signal from a cordless station, which ACK signal contains the identifier of the station. If the access units receive an ACK, they will return a copy of the ACK signal to the main unit and wait for a channel assignment signal from the main unit.

At the main unit, control proceeds to step 410 to receive the ACK signals from the selected access units and update the response status memory 107 with the identifiers of cordless stations which acknowledged the receipt of the second alert signal. Exit then is to step 411 to send a channel assignment signal to each ACK-returning access unit by containing in it the identifier of a speech channel which was previously selected by the access unit that forms a pair with the ACK-returning access unit to cover the same zone. Exit then is to step 412 to send a second ringing signal to that access unit which previously selected the speech channel to allow it to broadcast a copy of the second ringing signal over the speech channel. The second ringing signal contains the identifier of the station that failed to respond to the first alert signal. Therefore, this cordless station responds to it and operates its tone ringer.

Meanwhile, the access unit selected by step 408 deactivates its transceiver immediately following the transmission of the second ringing signal. All cordless stations are now alerted by ringing signals and one of the stations will go off hook and return an off-hook signal containing the identifier of the station to the associated access unit. A copy of the off-hook signal is sent from that access unit to the main unit.

At the main unit, control proceeds to step 413 to receive the off-hook signal, and exits to step 414 to send a turn-on signal to that access unit, operate the switch matrix 102 to establish a connection, and send clear-down signals to other access units which are not associated with the cordless station that answered the call. The call status memory 106 of the associated access unit is then updated with the identifier contained in the off-hook signal (step 415), and the main unit now enters a talking mode.

During a standby mode, each cordless station operates in a battery saving mode in which the cordless station cyclically switches to a relatively short active period in which it alternately monitors control channels C1 and C2 and then switches to a relatively long idle period in which it cuts off its power supply, and this process is repeated at periodic intervals and continued during the standby mode. However, on receiving a signal from an access unit, the cordless station disables the battery saving operation and enters a continued active state.

In FIGS. 5A and 5B, the program execution at each of the access units begins with decision step 501 to determine whether either of first and second alert signals is received from the main unit. If the answer is affirmative, control branches out to step 502 to broadcast the received alert signal on the assigned control channel in order to elicit an ACK response from cordless stations, and updates the call status memory 206 with data contained in the received alert signal, so that the call status memory 206 is loaded with the contents of the call status memory 106 at the main unit. In this way, the alert signal is broadcast on control channel C1 in zones Z1 and Z3 and on control channel C2 in zones Z2 and Z4. Exit then is to step 503 to receive an ACK signal from a cordless station and send a copy of the ACK to the main unit, and then on the step 504 to update data c stored in the response status memory 207 with the identifier of the ACK-returning cordless station.

Control advances to decision step 505 to check to see if $\overline{B}-c=0$. Since the complementary value of data B stored in the call status memory 206 represents the number of cordless stations available to respond to an alert signal regardless of their location, the subtraction of data c stored in the response status memory 207 from the complementary value of B determines that all cordless stations of the system are located in a single zone and that ACK signals are returned from these stations to an access unit of the zone if $\overline{B}-c=0$. If this is the case, control branches at step 505 to step 508. If the decision at step 505 is negative, control branches out to step 506 to determine whether a timeout period T has expired. Since the timing of each cordless station at which the active/idle cycle of its battery saving mode occurs is not synchronized with the timing of other cordless stations, the time-out action of step 506 allows each access unit to confirm that all cordless stations located in the same zone as the access unit have returned acknowledgment signals. If the answer is negative, control branches at step 506 to step 503 to repeat the process, and if affirmative, it branches to step 507 to check to see if at least one ACK signal is received within the period T. If it is, control proceeds to step 508, otherwise it returns to step 501, recognizing that there is not cordless station responding to the alert signal.

At step 508 control determines whether the alert signal received at step 501 is a first or second alert signal. If the signal received at step 501 is the first alert signal, control branches at step 508 to step 509 to select a speech channel and broadcast a speech channel assignment signal containing the identifier of the selected speech channel. On receiving the channel assignment signal, each cordless station switches its transceiver from the control channel to the selected speech channel and returns a channel switching complete (CSC) signal over the speech channel. At the access unit, transceiver 202 is also switched from the control channel to the selected speech channel (step 510) to receive CSC signals from stations located in the same zone, and send copies of the CSC signals to the main unit (step 511). Control moves to step 512 to receive a first ringing signal from the main unit and broadcast its copy. Exit then is to step 513 to check to see if a second ringing signal is received from the main unit. If the answer is affirmative, control branches at step 513 to step 514 to broadcast a copy of the second ringing signal.

Steps 513 and 514 are followed by decision step 515 to check to see if an off-hook signal is received from a cordless station. If the answer is affirmative, control branches at step 515 to 516 to transmit a copy of the off-hook signal to the main unit; otherwise it returns to step 501 to repeat the above process. Control proceeds to step 517 to determine whether a turn-on or a clear-down signal is received from the main unit. If the turn-on signal is received, control moves to step 518 to broadcast its copy to allow the cordless station that answered the incoming call to turn on its speech circuit. If the clear-down signal is received, control branches at step 517 to step 519 to reset the access unit and enters a standby (idle) mode.

If the signal received at step 501 is determined by step 508 to be a second alert signal, control branches out to step 520 to receive a channel assignment signal from the main unit and broadcast its copy in order to elicit an ACK response from a cordless station which has failed to respond to the first alert signal. Exit then is to step 521 to deactivate transceiver 202, and enters a standby state.

Figure 7:
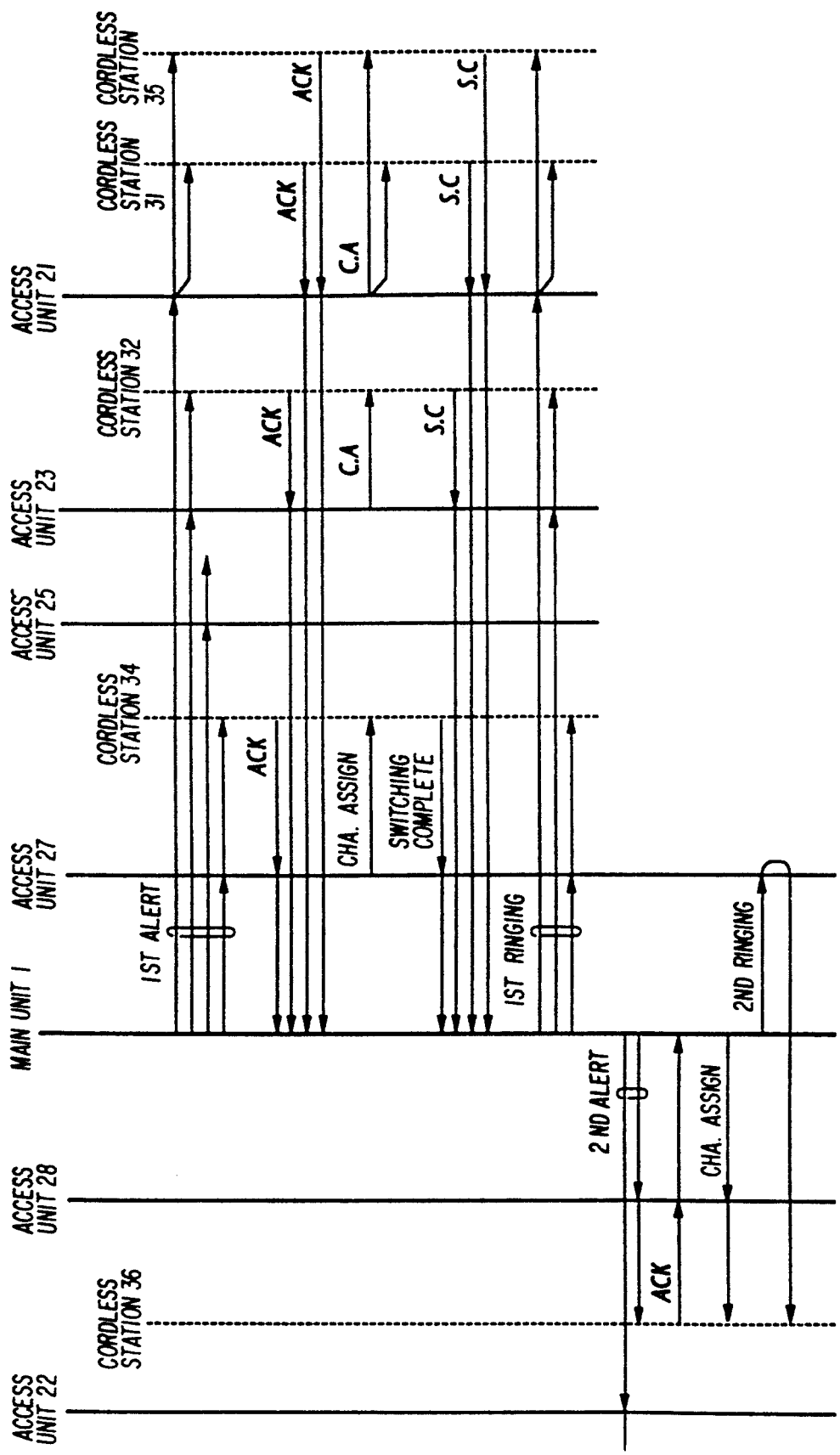
FIG. 7 is a sequence diagram associated with FIG. 6 to show a sequence of signals exchanged through the system.

The operation of the present invention will be better understood with the following description with reference to FIGS. 6 and 7 under the assumption that there is an incoming call from the network on exchange line 42 when (a) cordless stations 31~36 are located as shown in FIG. 1 (cordless station 36 is located in interference-affected zone Z24), (b) cordless station 33 is already in communication with a distant party on exchange line 41 through access unit 26 using a speech channel S4, and (c) access units 21, 23, 25 and 27 are to be selected by the main unit in response to the first alert signal. During the time just prior to the arrival of the incoming call, the contents of call status memory 106 are "0 0 0 0 1 0 0" and cordless stations 31, 32, 34, 35 and 36 are operating in a battery saving mode as shown in FIG. 6.

The arrival of the incoming call on exchange line 42 causes the main unit to select access units 21, 23, 25 and 27 and send a first alert signal to each of these units (steps 401, 402), whereupon it broadcasts a copy of the alert signal and updates the call status memory 206 as "0 0 0 0 0 1 0 0" (steps 501, 502). The alert signals from access units 21, 23, 25 and 27 are respectively broadcast on control channels C1, C2, C1 and C2 (see FIGS. 6 and 7). The first alert signal sent from access unit 21 (zone Z1) is received by both cordless stations 31 and 35, while in zones Z2 and Z4 the first alert signals from access units 23 and 27 are received by stations 32 and 34, respectively. In zone Z3, there is no station available to receive the first alert signal. In the interference-affected zone Z24, cordless station 36 fails to respond to the first alert signal in zones Z2 and Z4. Cordless stations 31, 32, 34 and 35 return ACK signals, which are received by the associated access units, copied to the main unit and used to update response status memory 206 (steps 503, 504).

The main unit receives the ACK signals from access units 21, 23 and 27 and updates its response status memory 106 so that data C reads "1 1 0 1 1 0 0 0" (step 403), and the response status memories 207 of access units 21, 23, 25 and 27 are updated with the identifier of the station returning the ACK. Therefore, the contents (data c) of response status memory 207 of the access units are as follows:

Access unit 21 = "1 0 0 0 1 0 0 0"
Access unit 23 = "0 1 0 0 0 0 0 0"
Access unit 25 = "0 0 0 0 0 0 0 0"
Access unit 27 = "0 0 0 1 0 0 0 0".

Since the complementary value of data B in each of these access units is "1 1 1 1 1 0 1 1", a negative decision results from step 505 in access units 21, 23, 25 and 27. Access units 21, 23 and 27 proceed to execute steps 505 through 507 and branches out step 508, while access unit 25 branches at step 507 to step 501 after executing the same steps.

Since the signal received at step 501 is the first alert signal, access units 21, 23 and 27 branch at step 508 to step 509 to select speech channels S1, S2 and S3, respectively, and channel assignment signals are broadcast from these access units (step 509) and their transceivers are switched to the respective speech channels (step 510). In this way, speech channels S1 are established between access unit 21 and cordless stations 31 and 35, speech channel S2 is established between access unit 23 and cordless station 32 and speech channel S3 is established between access unit 27 and cordless station 34.

Cordless stations 31, 32, 34 and 35 return a channel switching complete (CSC) signal over the established speech channels, and copies of the CSC signals are transmitted to the main unit (steps 511, 404). First ringing signals are supplied from the main unit to access units 21, 23 and 27 (step 405) and transmitted to cordless stations 31, 32, 34 and 35 (step 512).

Since there is one cordless station that has failed to respond to the first alert signal, the main unit makes a negative decision at step 406 and determines that it is the cordless station 36 failing to respond to the first alert signal (step 407), and executes step 408 to select an idle access unit from zones Z1 and Z3 and another unit from zones Z2 and Z4. If the main unit selects an access unit 22 from zones Z1 and Z3 and access unit 28 from zones Z2 and Z4, it sends a second alert signal containing the identifier of station 36 to each of access units 22 and 28 as well as data B stored in call status memory 106 (steps 409, 501, 502).

Cordless station 36 now responds to the second alert signal by returning an ACK signal to access unit 28, whereas no ACK response is returned to access unit 22. Therefore, control at access unit 22 branches at step 503 to step 501 to enter a standby state, while access unit 28 returns a copy of the ACK response from station 36 to the main unit and updates its response status memory 207 (steps 504, 505).

On receiving the ACK from access unit 28, the main unit updates its response status memory 106 (step 410) and sends a channel assignment signal to access unit 28, containing the identifier of speech channel S3 which was selected by access unit 27 for zone Z4. Following the transmission of the channel assignment signal, the main unit sends a second ringing signal to access unit 27 (step 412). On receiving the second ringing signal, access unit 27 broadcasts its copy to alert cordless station 36 (steps 513, 514). Meanwhile, access unit 28 is executing steps 506, 507, 508 and 520 to receive the channel assignment signal from the main unit and deactivate its transceiver 202 at step 521.

It is seen that all cordless stations except for station 33 are alerted with ringing signals and a line indicator corresponding to exchange line 42 is lighted to indicate the arrival of an incoming call. When one of these cordless stations answers the call, it sends an off-hook signal, which is received by the associated access unit and a copy of this off-hook signal is sent to the main unit (steps 515, 516). In response, the main unit executes steps 413 and 414 by sending a turn-on signal to the access unit that returned the off-hook signal and a clear-down signals to the other access units to permit them to reset to a standby state (step 519), while operating switch matrix 102 to establish a connection between line 42 and the station that answered the call.

What is claimed is:

1. A cordless key telephone system for servicing a plurality of service zones to which control channels are respectively assigned, said service zones partially overlapping to form a zone in which radio frequency interference occurs due to assignment of a single control channel to adjacent service zones, said system comprising a main unit having first terminals connected to a switched network and second terminals for establishing a connection between said first and second terminals, and a plurality of access units connected to the second terminals of the main unit for establishing a radio-frequency channel to cordless stations, each of said access units comprising means for broadcasting a signal when directed by said main unit, the system comprising:

means, provided in said main unit, for initially selecting an access unit from each of said service zones in response to an incoming call from said network and directing the selected access unit to broadcast a first alert signal;

means, provided in each of said access units, responsive to an acknowledgment (ACK) signal signalling receipt of the first alert signal from a cordless station, for selecting a speech channel and broadcasting a first channel assignment signal signalling identification of the selected speech channel;

means, provided in said main unit, for directing the selected access unit to broadcast a first ringing signal;

means, provided in said main unit, for detecting when a cordless station fails to return an acknowledgment signal signalling receipt of the first alert signal and directing a first access unit, which is not initially selected and located in one of said adjacent service zones, to broadcast a second alert signal and receive an ACK signal signalling receipt of the second alert signal from a cordless station; and means, provided in said main unit, responsive to said first access unit receiving said ACK signal, for directing said first access unit to broadcast a second channel assignment signal signalling identification of a speech channel previously selected by a second access unit which is initially selected and located in one of said adjacent service zones, and subsequently directing said second access unit to broadcast a second ringing signal on said previously selected speech channel.

2. A cordless key telephone system as claimed in claim 1, wherein said second alert signal contains identification of said cordless station failing to return said ACK signal signalling receipt of the first alert signal to exclusively allow same to return to said first access unit an ACK signal signalling receipt of the second alert signal.

3. A cordless key telephone system as claimed in claim 1, wherein said first and second access units are located in the same service zone.

4. In a cordless key telephone system for servicing a plurality of service zones to which control channels are respectively assigned, said service zones partially overlapping to form a zone in which radio frequency intereference occurs due to assignment of a single control channel to adjacent service zones, said system comprising a main unit having first terminals connected to a switched network and second terminals for establishing a connection between said first and second terminals, and a plurality of access units connected to the second terminals of the main unit for establishing a radio-frequency channel to cordless stations, a method comprising the steps of:

a) selecting an access unit from each of said service zones in response to an incoming call from said network;

b) broadcasting a first alert signal from each of the selected access units on an assigned control channel;

c) receiving an acknowledgment (ACK) response signalling receipt of the first alert signal from a cordless station, selecting a speech channel, and broadcasting a first channel assignment signal signalling identification of the selected speech channel from the access unit which received said ACK signal;

d) broadcast a first ringing signal on said selected speech channel from the access unit which received said ACK signal;

e) making a first decision when there is a cordless station failing to return said ACK signal in response to the first alert signal or a second decision when there are no such cordless stations;

f) responsive to said first decision, selecting a first, idle access unit which is located in one of said adjacent service zones;

g) broadcasting a second alert signal from said first access unit on a control channel assigned thereto;

h) responsive to an ACK response signalling receipt of the second alert signal from a cordless station, broadcasting a second channel assignment signal signalling identification of a speech channel selected by the step (c) by a second access unit, which is located in one of said adjacent service zones, from said first access unit on the control channel assigned thereto;

i) broadcasting a second ringing signal from said second access unit, on the speech channel selected by the step (c) by said second access unit; and j) following the step (i) or in response to said second decision, establishing a connection between said network and a cordless station returning an off-hook signal.

* * * * *

UNITED STATES PATENT AND TRADEMARK OFFICE
CERTIFICATE OF CORRECTION

PATENT NO. : 5,305,371
DATED : April 19, 1994
INVENTOR(S) : Noboru SAEGUSA et al.

It is certified that error appears in the above-identified patent and that said Letters Patent is hereby corrected as shown below:

| | | |
|---|---|---|
| Abstract, | line 13, | delete "falling" and insert --failing--. |
| Col. 2, | line 44, | delete "2a and 2b" and insert --2A and 2B--. |
| Col. 7, | line 34, | delete "falls" and insert --fails--. |

Signed and Sealed this

Twenty-seventh Day of September, 1994

Attest:

Attesting Officer

BRUCE LEHMAN
Commissioner of Patents and Trademarks